United States Patent
Lee et al.

(10) Patent No.: US 11,718,031 B2
(45) Date of Patent: Aug. 8, 2023

(54) METHOD FOR IMPROVING LIFESPAN OF LCD OF MSLA 3D PRINTER

(71) Applicants: Huvitz Co., Ltd., Anyang-si (KR); Ossvis Co., Ltd., Anyang-si (KR)

(72) Inventors: Hee Jae Lee, Osan-si (KR); Joon Ha Kim, Incheon (KR)

(73) Assignees: HUVITZ CO., LTD.; OSSVIS CO., LTD.

( * ) Notice: Subject to any disclaimer, the term of this patent is extended or adjusted under 35 U.S.C. 154(b) by 0 days.

(21) Appl. No.: 17/676,810

(22) Filed: Feb. 21, 2022

(65) Prior Publication Data

US 2022/0266515 A1    Aug. 25, 2022

(30) Foreign Application Priority Data

Feb. 23, 2021   (KR) .................. 10-2021-0023740

(51) Int. Cl.
| | | |
|---|---|---|
| *B29C 64/286* | (2017.01) | |
| *B33Y 10/00* | (2015.01) | |
| *B33Y 40/00* | (2020.01) | |
| *B29C 64/124* | (2017.01) | |
| *B29C 64/393* | (2017.01) | |

(Continued)

(52) U.S. Cl.
CPC .......... *B29C 64/286* (2017.08); *B29C 64/124* (2017.08); *B33Y 10/00* (2014.12); *B33Y 40/00* (2014.12); *B29C 64/129* (2017.08); *B29C 64/282* (2017.08); *B29C 64/386* (2017.08); *B29C 64/393* (2017.08); *B33Y 30/00* (2014.12); *B33Y 50/00* (2014.12); *B33Y 50/02* (2014.12)

(58) Field of Classification Search
CPC ... B29C 64/286; B29C 64/124; B29C 64/282; B29C 64/393; B29C 64/129; B29C 64/386; B33Y 10/00; B33Y 30/00; B33Y 40/00; B33Y 50/00; B33Y 50/02
USPC ........................................................ 264/401
See application file for complete search history.

(56) References Cited

U.S. PATENT DOCUMENTS

| | | | |
|---|---|---|---|
| 2020/0254686 A1 | 8/2020 | Li et al. | |
| 2022/0072783 A1* | 3/2022 | Park | ................ B29C 64/129 |

FOREIGN PATENT DOCUMENTS

| | | |
|---|---|---|
| CN | 211683493 U | 10/2020 |
| JP | 2020121569 A | 8/2020 |

(Continued)

OTHER PUBLICATIONS

Lee et al. (KR102199897B1), Jan. 8, 2021, machine translation Korean to English. (Year: 2021).*

(Continued)

*Primary Examiner* — Joseph S Del Sole
*Assistant Examiner* — Lawrence D. Hohenbrink, Jr.
(74) *Attorney, Agent, or Firm* — Renaissance IP Law Group LLP

(57) ABSTRACT

The present inventive concept relates to a method for improving a lifespan of a liquid crystal display (LCD) of a masked stereolithography (MSLA) 3D printer, the method including the steps of: slicing a three-dimensional (3D) image into two-dimensional (2D) images; outputting the 2D images to the LCD; calculating irradiation area coordinates of UV LEDs in accordance with the 2D images; and irradiating UV light of the UV LEDs on an area matching with the 2D images in accordance with the calculated irradiation area coordinates of the UV LEDs.

3 Claims, 3 Drawing Sheets

(51) Int. Cl.
*B33Y 50/02* (2015.01)
*B33Y 50/00* (2015.01)
*B29C 64/129* (2017.01)
*B29C 64/282* (2017.01)
*B33Y 30/00* (2015.01)
*B29C 64/386* (2017.01)

(56) References Cited

FOREIGN PATENT DOCUMENTS

| KR | 102199897 B1 * | 1/2021 |
| KR | 102199897 B1 | 1/2021 |
| KR | 20210003063 A | 1/2021 |
| WO | 2020141822 A1 | 7/2020 |

OTHER PUBLICATIONS

European Extended Search Report for Application No. 22157851.1, dated Jun. 29, 2022.

\* cited by examiner

METHOD FOR IMPROVING LIFESPAN OF LCD OF MSLA 3D PRINTER

CROSS REFERENCE TO RELATED APPLICATION

The present application claims the benefit of Korean Patent Application No. 10-2021-0023740 filed in the Korean Intellectual Property Office on 10-2021-0023740 the entire contents of which are incorporated herein by reference.

BACKGROUND

1. Technical Field

The present inventive concept relates to a method for improving a lifespan of a liquid crystal display (LCD) of a masked stereolithography (MSLA) 3D printer, and more specifically, a method for improving a lifespan of an LCD of an MSLA 3D printer that is capable of controlling ultraviolet (UV) light-emitting diodes (LEDs) to allow UV light of the UV LEDs to be irradiated only onto an area of the LCD, which matches with a masking image.

2. Description of the Related Art

As a method for making a three-dimensional solid object, there are methods for making a mock-up manually and for making the 3D solid object by a cutting process through a numerical control machine tool.

The mock-up making method is low in manufacturing cost, but it is hard to perform precise shape machining and require a lot of manufacturing time. Further, the cutting method through the machine tool is possible to make a precise object, but it requires a high manufacturing cost and has limitations in shape machinable.

Recently, a 3D printer, which makes a 3D molded object using 3D drawing data through 3D modeling, has been widely used. The 3D printer is a machine that makes use of a material such as liquid, powder, metal, and the like to make the 3D solid molded object in accordance with the 3D drawing data.

Through the use of the 3D printer, advantageously, manufacturing cost and time may be substantially reduced, individual customized objects may be made, and solid objects complicated in shape may be simply manufactured. Accordingly, the solid objects may be easily corrected at the time when they are really made, and the manufacturing cost, the material cost, and the labor cost may be saved.

The 3D printer having such many advantages is applied in a variety of fields such as automobiles, flights, construction, medicine, home appliances, toys, and the like.

Examples of the 3D printer include a stereo lithography apparatus (SLA) 3D printer that scans laser onto UV curable resin and cures the scanned portion, a digital light processing (DLP) 3D printer that irradiates light onto the underside of a reservoir storing UV curable resin, an LCD 3D printer that laminates molded resin products on top of a build plate using UV light sources and an LCD panel, a selective laser sintering (SLS) 3D printer that sinters functional polymers or metal powder, a fused deposition modeling (FDM) 3D printer that extrudes and molds a melted resin, a laser-aid direct metal tooling (DMT) 3D printer that directly molds metal through high power laser beams, and a laminated object manufacturing (LOM) 3D printer.

In case of the conventional LCD 3D printer among them, all of UV LEDs are turned on and used as backlight, and next, only a desired area is masked using the LCD.

In this case, however, the LCD may have low reliability and a short lifespan due to heated UV LEDs. Because of the short lifespan of the LCD, that is, the 3D printer undesirably requires repeated maintenance works.

SUMMARY

Accordingly, the present inventive concept has been made in view of the above-mentioned problems occurring in the related art, and it is an object of the present inventive concept to provide a method for improving a lifespan of an LCD of an MSLA 3D printer that is capable of irradiating UV light of UV LEDs only onto an area of the LCD, which matches with a masking image.

It is another object of the present inventive concept to provide a method for improving a lifespan of an LCD of an MSLA 3D printer that is capable of calculating irradiation time of UV LEDs to estimate the lifespan of the LCD and suggest an efficient output product position.

To accomplish the above-mentioned objects, according to the present inventive concept, there is provided a method for improving a lifespan of a liquid crystal display (LCD) of a masked stereolithography (MSLA) 3D printer, the method including the steps of: slicing a three-dimensional (3D) image into two-dimensional (2D) images; outputting the 2D images to the LCD; calculating irradiation area coordinates of UV LEDs in accordance with the 2D images; and irradiating UV light of the UV LEDs on an area matching with the 2D images in accordance with the calculated irradiation area coordinates of the UV LEDs.

According to the present inventive concept, desirably, the step of calculating the irradiation area coordinate of the UV LEDs is carried out by calculating a diagonal length from an area obtained by multiplying a width of the image with the greatest area among the sliced 2D images by a height thereof and then calculating the radius of the diagonal length as the LED irradiation area.

According to the present inventive concept, desirably, the method may further include the step of collecting and storing the accumulation irradiation time data of the UV LEDs to calculate average irradiation time per area.

According to the present inventive concept, desirably, the images are outputted to an LCD area in the shortest range of the accumulation irradiation time.

BRIEF DESCRIPTION OF THE DRAWINGS

The above and other objects, features and advantages of the present inventive concept will be apparent from the following detailed description of the preferred embodiments of the invention in conjunction with the accompanying drawings, in which.

DETAILED DESCRIPTION OF THE PREFERRED EMBODIMENTS

Figure 1:
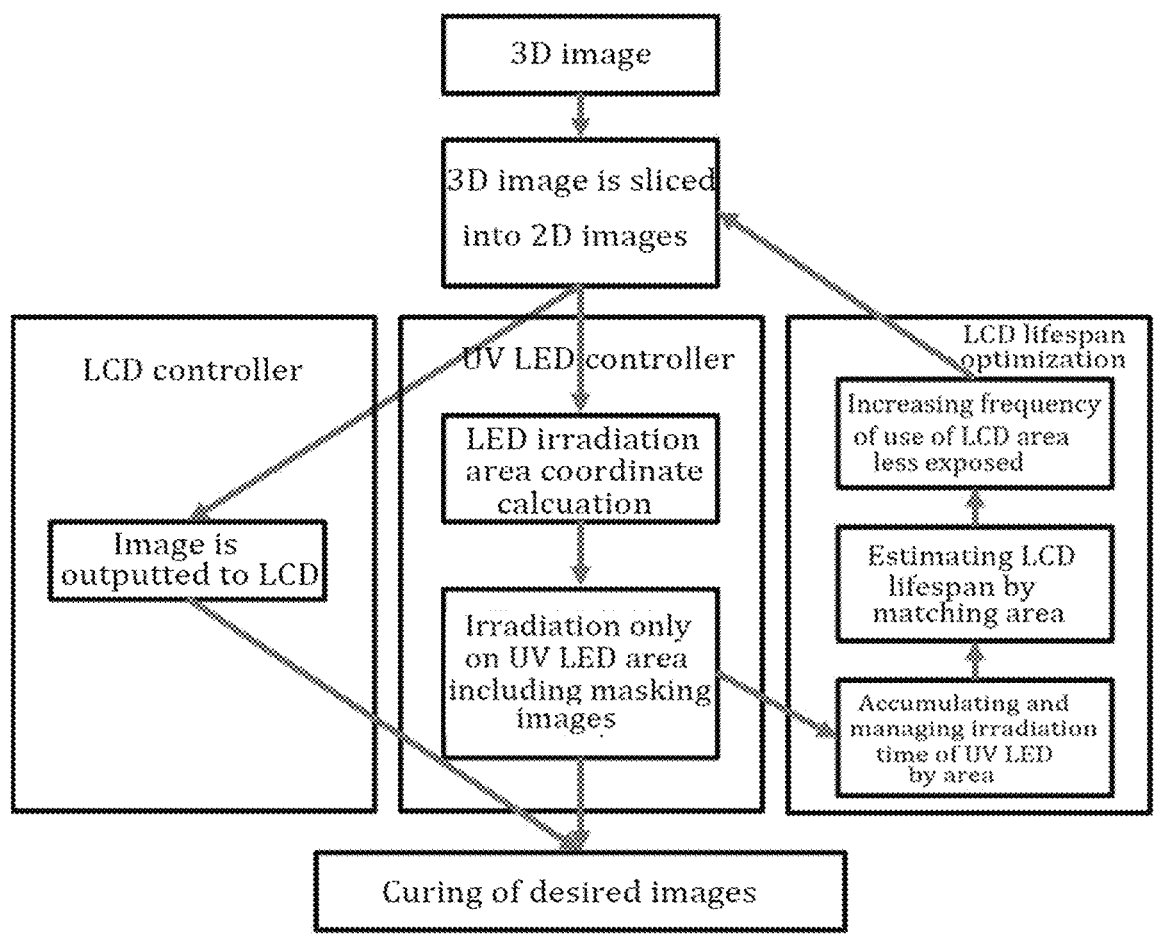
FIG. 1 is a block diagram showing a method for controlling UV LEDs of an MSLA 3D printer according to the present inventive concept.

Objects, characteristics and advantages of the present inventive concept will be more clearly understood from the detailed description as will be described below and the attached drawings. Before the present inventive concept is disclosed and described, it is to be understood that the disclosed embodiments are merely exemplary of the invention, which can be embodied in various forms. An embodiment of the present inventive concept as will be discussed later will be in detail described so that it may be carried out easily by those having ordinary skill in the art, and therefore, this does not limit the idea and technical scope of the invention.

In the description, the thicknesses of the lines or the sizes of the components shown in the drawing may be magnified for the clarity and convenience of the description. In the description, further, the corresponding parts in the embodiments of the present inventive concept are indicated by corresponding reference numerals.

A term 'and/or' includes a combination of a plurality of relevant and described items or any one of a plurality of related and described items. An expression referencing a singular value additionally refers to a corresponding expression of the plural number, unless explicitly limited otherwise by the context. In this application, terms, such as "comprise", "include", or 'have", are intended to designate those characteristics, numbers, steps, operations, elements, or parts which are described in the specification, or any combination of them that exist.

Hereinafter, the present inventive concept will be explained in detail with reference to the attached drawings.

FIG. 1 is a block diagram showing a method for controlling UV LEDs of an MSLA 3D printer according to the present inventive concept.

Referring to FIG. 1, a method for improving a lifespan of an LCD of an MSLA 3D printer according to the present inventive concept is carried out by controlling UV LEDs only on an area matching with a masking image of the LCD to thus irradiate UV light of the UV LEDs. That is, the respective UV LEDs are controlled by area, and they are heated, so that the portion of the LCD onto which the UV light of the UV LEDs is irradiated is minimized.

To do this, first, a 3D image is sliced to produce 2D masking images. In this case, an LCD controller outputs an LCD image as the same image as the produced 2D masking image.

Further, a UV LED controller calculates a coordinate of an LED irradiation area and irradiates the UV light of the UV LEDs only on the area matching with the masking image.

In the conventional MSLA 3D printer, that is, all of the UV LEDs are turned on and used as backlight, and then, only a desired portion is masked using the LCD. According to the present inventive concept, however, the UV light of the UV LEDs is controlled only on area matching with the LCD masking image and thus irradiated from the corresponding area of the UV LEDs.

To calculate the LED irradiation area, the 3D image is sliced into the 2D images, first, a diagonal length is calculated from an area obtained by multiplying a width of the image with the greatest area among the sliced 2D images by a height thereof, and next, the radius of the diagonal length is calculated as the LED irradiation area ($S=\pi r^2$, where S is irradiation area and r is radius).

As the UV light of the UV LEDs only on the area corresponding to the coordinate of the LCD irradiation area is irradiated, further, the accumulation irradiation time of the UV LEDs located on the corresponding area is calculated to estimate the lifespan of the LCD.

Accordingly, the irradiation time data of the UV LEDs located on the corresponding area are collected to manage total irradiation time of the UV LEDs, so that the lifespans of both of the LCD and the UV LEDs can be improved.

Further, UV average accumulation irradiation time per area is calculated to allow output to the LCD area in the shortest range of the average accumulation irradiation time per area, thereby improving the lifespan of the LCD. That is, the frequency of use of the LCD area less exposed can be increased.

Figure 2:
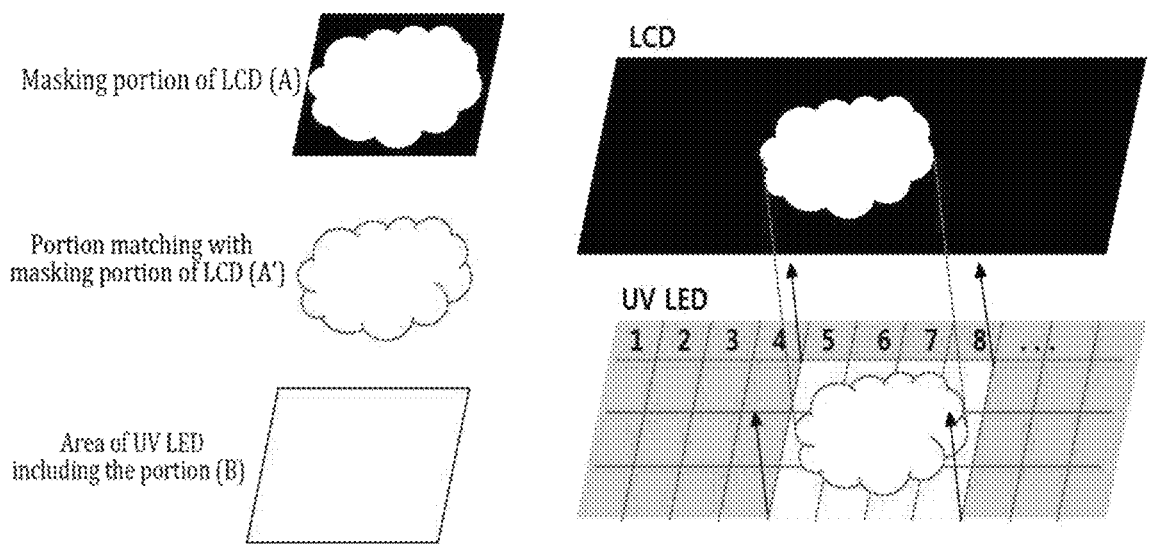
FIG. 2 is a concept view showing a method for controlling divided UV LED areas to irradiate UV light of UV LEDs only from an area matching with a masking image of an LCD according to the present inventive concept.

FIG. 2 is a concept view showing a method for controlling divided UV LED areas to irradiate UV light of UV LEDs only from an area matching with a masking image of an LCD according to the present inventive concept.

Referring to FIG. 2, the LED irradiation area of each 2D image obtained by slicing the 3D image is calculated to optimize the lifespans of the UV LEDs. As described above, the diagonal length is calculated from an area obtained by multiplying a width of the image with the greatest area among the sliced 2D images by a height thereof, and next, the radius of the diagonal length is calculated as the LED irradiation area ($S=\pi r^2$, where S is irradiation area and r is radius).

Further, the LCD image per frame is outputted from the LCD area where the average accumulation irradiation time per area is shortest, thereby improving the lifespan of the LCD.

Figure 3:
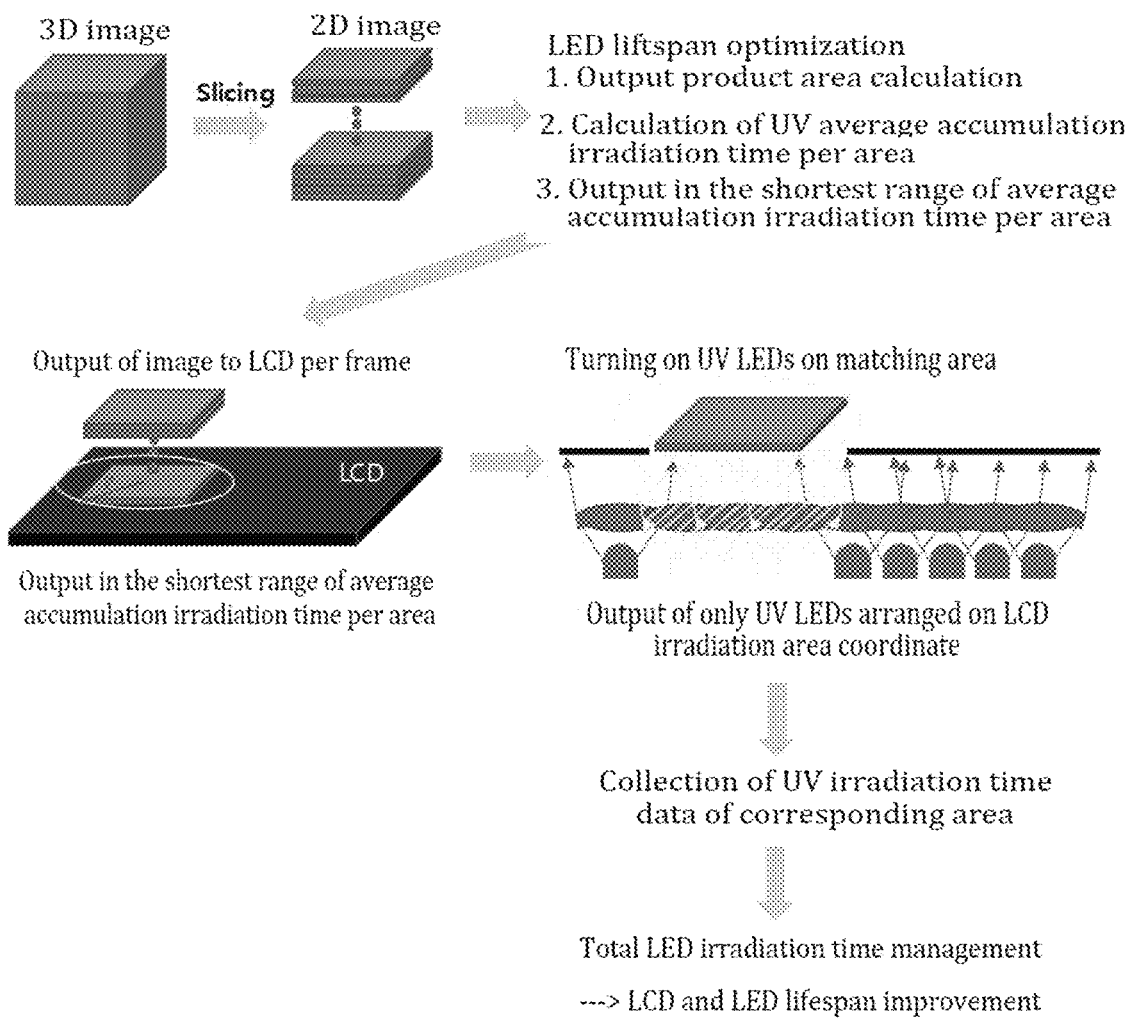
FIG. 3 is a concept view showing the output of the UV light of only the UV LEDs on an area matching with a sliced 2D image according to the present inventive concept.

FIG. 3 is a concept view showing the output of the UV light of only the UV LEDs on an area matching with a sliced 2D image according to the present inventive concept.

Referring to FIG. 3, the UV LEDs located on the area matching with the LCD image are turned on. In this case, projection lenses for projecting the UV light of the UV LEDs onto an appropriate area are optimizedly arranged on the LCD area.

Further, the irradiation time data of the UV LEDs onto the corresponding LCD area are collected to manage total irradiation time of the UV LEDs on the area, thereby improving the lifespans of both of the LCD and the UV LEDs. That is, the frequency of use of the LCD area less exposed can be increased, and the LCD liftspan by matching area can be estimated.

As set forth in the foregoing, the present inventive concept can extend the lifespan of the LCD of the conventional MSLA 3D printer.

In addition, the present inventive concept can estimate and manage the lifespans of the LCD areas matching with the UV LEDs.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A method for improving a lifespan of a liquid crystal display (LCD) of a masked stereolithography (MSLA) 3D printer, the method comprising the steps of:

slicing a three-dimensional (3D) image into two-dimensional (2D) images;
outputting the 2D images to the LCD;
calculating irradiation area coordinates of UV LEDs in accordance with the 2D images;
irradiating UV light of the UV LEDs on an area matching with the 2D images in accordance with the calculated irradiation area coordinates of the UV LEDs; and
collecting and storing accumulation irradiation time data of the UV LEDs to calculate average irradiation time per area.

2. The method according to claim 1, wherein the step of calculating the irradiation area coordinates of the UV LEDs is carried out by calculating a diagonal length from an area obtained by multiplying a width of the image with the greatest area among the 2D images by a height thereof and then calculating a radius of the diagonal length as the irradiation area.

3. The method according to claim 1, wherein the 2D images are outputted to an LCD area in the shortest range of the accumulation irradiation time.

* * * * *